US006797668B2

(12) United States Patent
Yoshikawa

(10) Patent No.: US 6,797,668 B2
(45) Date of Patent: Sep. 28, 2004

(54) EXHAUST GAS PURIFYING CATALYST

(75) Inventor: Tatsuya Yoshikawa, Himeji (JP)

(73) Assignees: ICT Co., Ltd., Osaka (JP); International Catalyst Technology, Inc., Ridgefield Park, NJ (US)

( * ) Notice: Subject to any disclaimer, the term of this patent is extended or adjusted under 35 U.S.C. 154(b) by 135 days.

(21) Appl. No.: 10/014,027

(22) Filed: Dec. 10, 2001

(65) Prior Publication Data

US 2002/0107141 A1 Aug. 8, 2002

(30) Foreign Application Priority Data

Dec. 12, 2000 (JP) ........................................ 2000-377705

(51) Int. Cl.[7] ........................... B01J 23/00; B01J 23/40; B01J 23/42; B01J 23/58; B01J 23/56

(52) U.S. Cl. ....................... 502/304; 502/302; 502/327; 502/328; 502/332; 502/333; 502/334; 502/336; 502/338; 502/339; 502/349; 502/439

(58) Field of Search ................................. 502/302, 303, 502/304, 327, 328, 332, 333, 334, 336, 338, 339, 349, 439, 355, 415

(56) References Cited

U.S. PATENT DOCUMENTS

| | | | | | |
|---|---|---|---|---|---|
| 4,927,799 | A | | 5/1990 | Matsumoto et al. | 502/303 |
| 5,139,992 | A | * | 8/1992 | Tauster et al. | 502/304 |
| 5,212,142 | A | * | 5/1993 | Dettling | 502/304 |
| 5,254,519 | A | * | 10/1993 | Wan et al. | 502/252 |
| 5,607,892 | A | | 3/1997 | Chopin et al. | 502/304 |
| 5,626,826 | A | | 5/1997 | Chopin et al. | 423/213.2 |
| 5,888,464 | A | * | 3/1999 | Wu et al. | 423/213.5 |
| 5,898,014 | A | * | 4/1999 | Wu et al. | |
| 5,958,827 | A | * | 9/1999 | Suda et al. | 502/304 |
| 5,958,828 | A | * | 9/1999 | Murakami et al. | 502/333 |
| 5,989,507 | A | * | 11/1999 | Sung et al. | 423/213.5 |
| 6,150,288 | A | | 11/2000 | Suzuki et al. | 501/105 |
| 6,171,572 | B1 | | 1/2001 | Aozasa | 423/593 |
| 6,180,075 | B1 | | 1/2001 | Lindner et al. | 423/213.2 |
| 6,214,306 | B1 | | 4/2001 | Aubert et al. | 423/213.2 |
| 6,261,989 | B1 | * | 7/2001 | Tanaka et al. | 502/217 |
| 6,306,794 | B1 | | 10/2001 | Suzuki et al. | 502/304 |
| 6,326,329 | B1 | * | 12/2001 | Nunan | 502/242 |
| 6,335,305 | B1 | * | 1/2002 | Suzuki et al. | 502/325 |
| 6,339,037 | B1 | * | 1/2002 | Kase et al. | 502/300 |
| 6,464,946 | B1 | * | 10/2002 | Yamada et al. | 422/177 |
| 6,476,259 | B2 | * | 11/2002 | Kase et al. | 562/532 |
| 6,492,297 | B1 | * | 12/2002 | Sung | 502/304 |
| 6,555,081 | B2 | * | 4/2003 | Hori et al. | 423/239.1 |
| 6,576,200 | B1 | * | 6/2003 | Yamamoto et al. | 422/177 |
| 6,583,316 | B1 | * | 6/2003 | Onodera et al. | 562/537 |
| 6,589,496 | B1 | * | 7/2003 | Yabe et al. | 423/263 |
| 6,625,976 | B1 | * | 9/2003 | Andersen et al. | 60/299 |
| 6,682,706 | B1 | * | 1/2004 | Yamamoto et al. | 422/180 |

FOREIGN PATENT DOCUMENTS

| | | | |
|---|---|---|---|
| EP | 0 715 879 A1 | 6/1996 | B01D/53/94 |
| EP | 0 842 900 A1 | 5/1998 | C01G/25/00 |
| EP | 0 870 543 A2 | 10/1998 | B01J/23/10 |
| JP | 11-21171 | 1/1999 | C04B/35/50 |

* cited by examiner

*Primary Examiner*—Cam N. Nguyen
(74) *Attorney, Agent, or Firm*—Fish & RIchardson P.C.

(57) ABSTRACT

A catalyst for purifying exhaust gases from internal combustion engines with high efficiencies of CO/NOx even under the conditions large A/F fluctuations. The catalyst includes a complex in which the oxides of cerium are deposited on a solid solution oxide containing Zr and Ce.

18 Claims, 9 Drawing Sheets

EXHAUST GAS PURIFYING CATALYST

BACKGROUND OF THE INVENTION

1. Field of the Invention

The present invention relates to a catalyst for purifying exhaust gases from internal combustion engines. More specifically, it relates to a catalyst for purifying exhaust gases with a high efficiency under not only small but also large fluctuation conditions of air to fuel ratio (A/F).

2. Description of Related Art

Catalysts, which are placed in an exhaust gas pipe of automobiles, have been used for purifying exhaust gases since the enactment of Musky law. For gasoline engines so called Three Way Catalyst is standardized in which techniques have been proposed for simultaneously removing hydrocarbons (HC), carbon monoxide (CO), and nitrogen oxides (NOx) using the catalytic composite of noble metals such as platinum, rhodium and palladium, and functional materials of ceria or the like. In the recent years, it is a growing demand for catalysts to have much catalytic efficiency and multiple functions for the treatment of exhaust gases on account of the social attention for clean air or the reinforcement of legal controls for automotive emissions.

The followings are the examples of potential demand for Three way (type) catalyst for the treatment of exhaust gas. 1. The treatment of unburned HC generated at cold-start operation. (A catalyst usually does not work efficiently at cold temperature) 2. Durability improvement 3. The response of catalyst for the various driving conditions, especially in acceleration/deceleration driving, which can induce large fluctuations of A/F and space velocity (SV), then cause the change of catalyst efficiency. To control emissions, therefore, automotive manufactures pay much effort on the control of (A/F) in various driving conditions, e.g., by adjusting (A/F) to near stoichiometry region using sensors and modeling method, as the performance of catalyst could change drastically with the change of (A/F).

Ceria has a function of storing and emitting oxygen according to the change of atmospheres (hereinafter it may be referred to as OSC: Oxygen Storage Component), which can improve the function of catalysts. However, since ceria itself has poor heat-resistance, OSC materials with a high heat-resistance have been developed by combining cerium with other elements such as zirconium. JP-A-10-182,155 discloses cerium-zirconium complex oxides and the catalyst containing the oxide of the solid solution uniformly prepared has a superior catalyst activity. JP-A-10-194,742 and Japanese Patent No.2,787,540 proposed preparations for solid solution oxides.

However, conventional oxygen storage materials have drawbacks that they act effectively for small fluctuations nearby the stoichiometric A/F but do not act fully under relatively large fluctuations conditions.

SUMMARY OF THE INVENTION

In view of the above affairs, an object of the present invention is to provide a catalyst for purifying exhaust gases with a high efficiency under conditions of large fluctuations of A/F, and a production method thereof.

According to the present invention, there is provided an improved exhaust gas purifying catalyst comprising a complex of the oxides of cerium and a solid solution oxide containing Zr and Ce.

According to the present invention, there is provided a method for producing exhaust gases purification catalyst, comprising depositing a soluble salt of cerium to a solid solution oxide containing Zr and Ce to form a complex thereof.

The technical scope of the present invention extends to the extent that is readily replaced with persons skilled in the art without being limited by the words or terms defined in the claims of the present invention.

According to the present catalyst, it can efficiently remove CO, HC, and NOx from exhaust gases of internal combustion engines such as gasoline engines as a type of Three Way Catalyst, even under conditions of large fluctuations of A/F by not reducing much of its efficiency, especially for CO/NOx, and maintain its activities with practical durability.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DETAILED DESCRIPTION OF THE PREFERRED EMBODIMENTS

Figure 1:
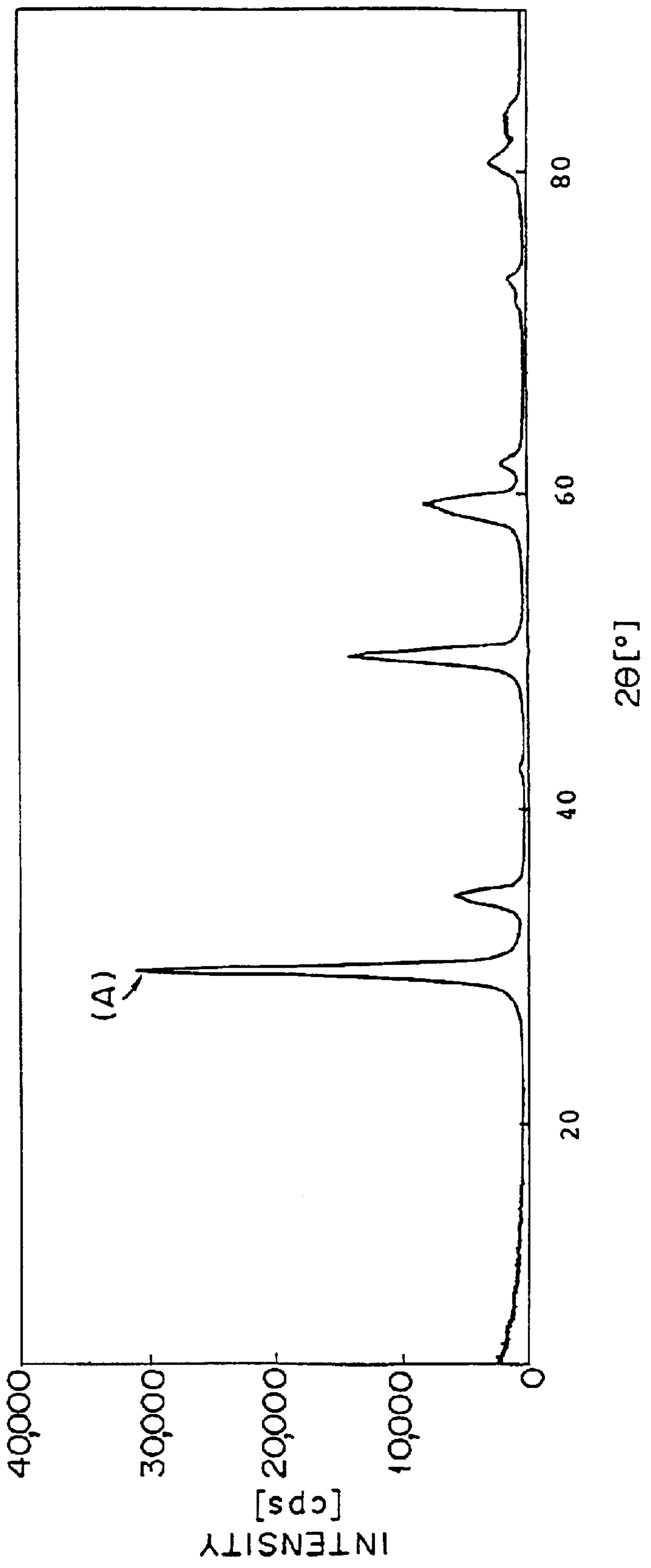
FIG. 1 shows a graph indicating an X-ray diffraction pattern of the solid solution oxide used in the present invention.

I have studied diligently for solving the above problems and finally found that a material obtained by depositing or carrying or supporting the oxides of cerium on an oxide of a zirconium-cerium solid solution, when used as the whole or part of the OSC material of Three Way Catalyst, exhibits high CO/NOx purification efficiency against large fluctuations of A/F. The present invention has been achieved.

The oxide of a solid solution containing zirconium and cerium, which is used in the present invention, is preferably to have the following features. The diffraction pattern (XRD) of the powder for the solid solution oxide indicates substantially for $ZrO_2$ structure and shows no substantial pattern for $CeO_2$. When the powder is calcined at 1,000° C. for three hours and then measured by XRD, a ratio of the peak height derived from cerium dioxide at 2 θ=28.4°±0.1° (d=3.1) to the peak height derived from zirconium dioxide at 2 θ=29.8°±0.1° (d=3.0) is not more than 2%. A molar ratio of Ce:Zr in the solid solution oxide is preferably in the range of 0.05 to 0.49:0.95 to 0.51, and preferably 0.10 to 0.40:0.90 to 0.60. The solid solution oxide may be doped for improving heat-resistance and oxygen storage property with a doping member such as rare earth elements, e.g., lanthanum, praseodymium, neodymium, promethium, samarium, europium, gadolinium, terbium, dysprosium, holmium, erbium and thulium; an alkaline earth metal, e.g., magnesium, calcium, strontium and barium; yttrium; aluminum; iron or the like. Ordinary, the doping member may be inserted into the solid solution oxide in the range of 0.1 to 20% by weight, based on the weight of the solid solution oxide. Its specific surface area (BET) is preferably not less than 20 $m^2/g$, and more preferably in the range of 30 to 100 $m^2/g$, on the condition that the powder has been treated at 900° C. for five hours in air atmosphere.

In the deposition of the oxides of cerium on the solid solution oxide, it does not always need pre-treatment. However, the pre-treatment under hydrogen atmosphere at a temperature of 300° C. to 600° C. may be performed for stabilizing the deposition.

Deposition of the oxides of cerium on the solid solution oxide may be achieved by depositing a soluble salt of cerium, in particular water soluble salt such as a nitrate, acetate, oxalate, chloride or the like on the solid solution oxide by means of a method known to persons skilled in the art like impregnation, precipitation. Then, this precursor is generally dried at 100° C. to 250° C. and subsequently calcined at 300° C. to 1,200° C., preferably at 400° C. to 1,000° C., thereby the oxides of cerium are deposited on the solid solution oxide.

The solid solution oxide is generally synthesized, for instance, by forming a precipitate from a mixture of cerium sol and zirconium sol as the raw materials, and then calcining the precipitate, e.g., at 600° C. to 1,100° C. in air. The oxides of cerium precursor may be added onto the precursor (the precipitate) of the solid solution oxide (prior to the final calcination).

The oxides of cerium are deposited on the solid solution oxide. The deposition ratio of the oxides of cerium to the solid solution oxide may be 3 to 50:100 parts by weight, preferably 10 to 40:100 parts by weight. If this rate is less than the lower limit, the effect will not be clearly observed, adversely if the rate exceeds the upper limit, the extra effect in proportion to the addition of the oxides of cerium will not be expected. Generally, Three Way Catalyst includes an OSC component, e.g., cerium oxide, but its effect can be saturated when a certain amount thereof is added. The present catalyst feature is clearly observed even under the saturated region by the deposition of the oxides of cerium.

During or after deposition of the oxides of cerium thereon, at least one member selected from the group consisting of Pt, Pd, Rh, Ir, Nd, Ba, La, Y and Pr may be also incorporated, whose amount is usually in the range of 0.05 to 30 parts by weight, preferably 0.05 to 20 parts by weight, based on 100 parts by weight of the solid solution oxide. This addition sometimes promotes the catalyst activities such as light-off property and water gas shift reaction. The addition is preferably performed using a decomposable salt such as acetate, nitrate or chloride or the like as the raw material.

The deposition of the oxides of cerium may be performed after the solid solution oxide has been dispersed and/or deposited on a conventional refractory inorganic oxide powder such as an activated alumina, and silica-alumina. According to this dispersion, it sometimes improves durability of the catalyst since a direct contact of precious or noble metals deposited on other inorganic powders with the oxides of cerium can be moderated, then preventing the precious metals from deactivation by reducing the opportunities of direct contact of the precious metals with the oxides of cerium, since the oxides of cerium sometimes promote deactivation of the precious metals. The deposition rate of the solid solution oxide to the inorganic oxide may be 1:0 to 100 parts by weight, preferably 1:0.5 to 10 parts by weight.

The complex to be used in the present invention may be represented by the formula 1:

$$CeOx/Zr\text{—}Ce\text{—}O \qquad (1)$$

wherein the term Zr—Ce—O is an oxide of the solid solution exhibiting zirconium dioxide structure by XRD, and the term CeOx is the oxides of cerium deposited onto the solid solution oxide. Here, the complex in which the oxides of cerium are deposited on an oxide of solid solution containing zirconium and cerium, is defined as the solid solution oxide having at least direct bonding, i.e., chemical bonding of the oxides of cerium to the surface of the solid solution oxide.

Figure 4:
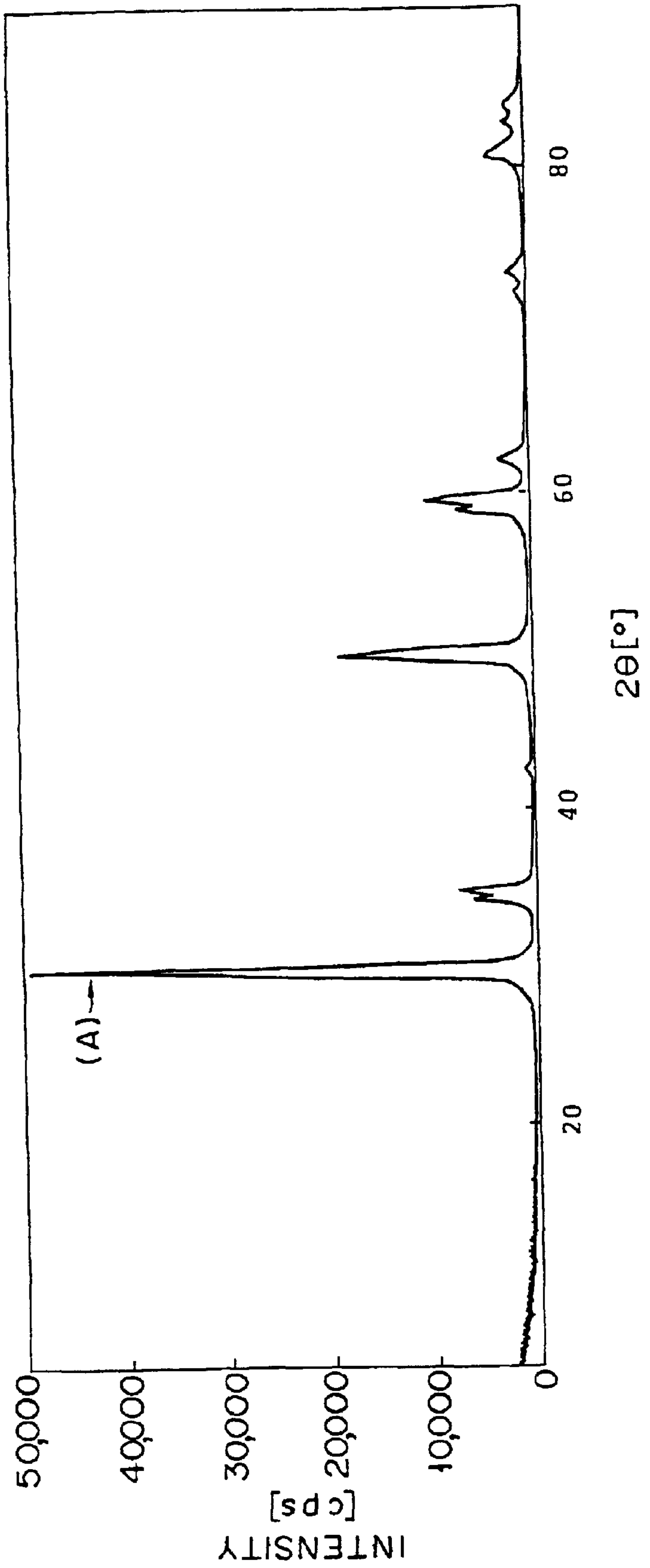
FIG. 4 shows a graph indicating an X-ray diffraction pattern of another solid solution oxide used in the present invention.

FIGS. 1 and 4 show graphs indicating X-ray diffraction patterns of the solid solution oxides used in the present invention. The solid solution oxide in FIG. 1 is calcined at 550° C., and that in FIG. 4 is calcined at 1,000° C.

Figure 2:
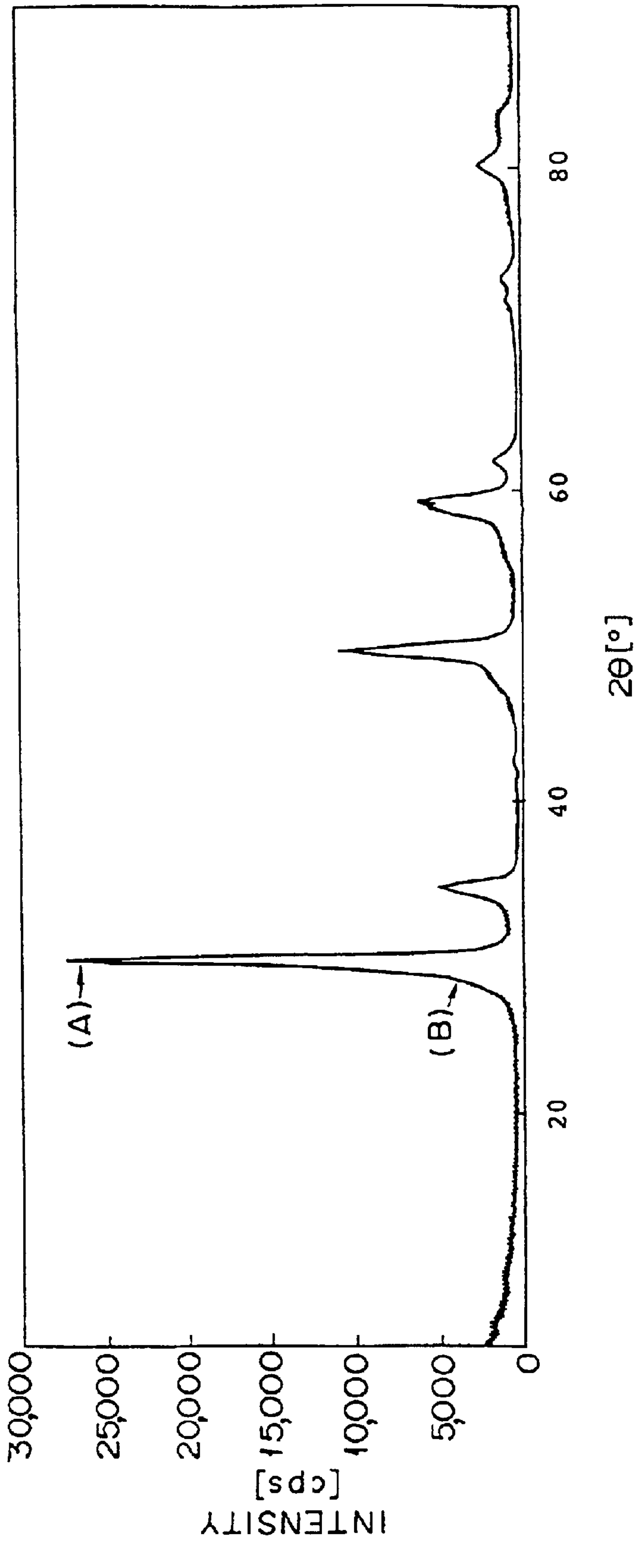
FIG. 2 shows a graph indicating an X-ray diffraction pattern of a complex in which the oxides of cerium are deposited on the solid solution oxide used in the present invention.
Figure 5:
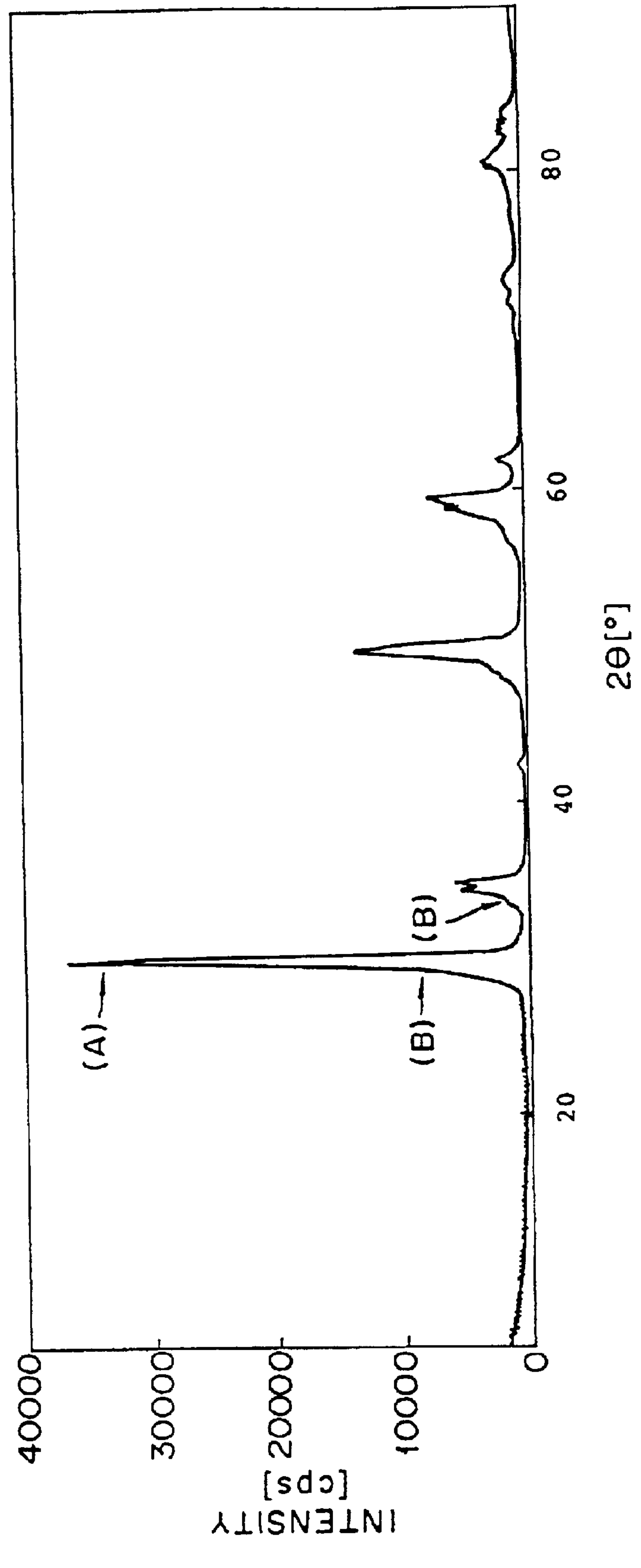
FIG. 5 shows a graph indicating an X-ray diffraction pattern of a complex in which the oxides of cerium are deposited on the solid solution oxide used in the present invention.

FIGS. 2 and 5 show graphs indicating X-ray diffraction patterns of the complexes used in the present invention. The oxides of cerium are deposited on the solid solution oxide at 20% by weight as $CeO_2$, then one is calcined at 550° C. for FIG. 2, and the other calcined at 1,000° C. for FIG. 5.

Figure 3:
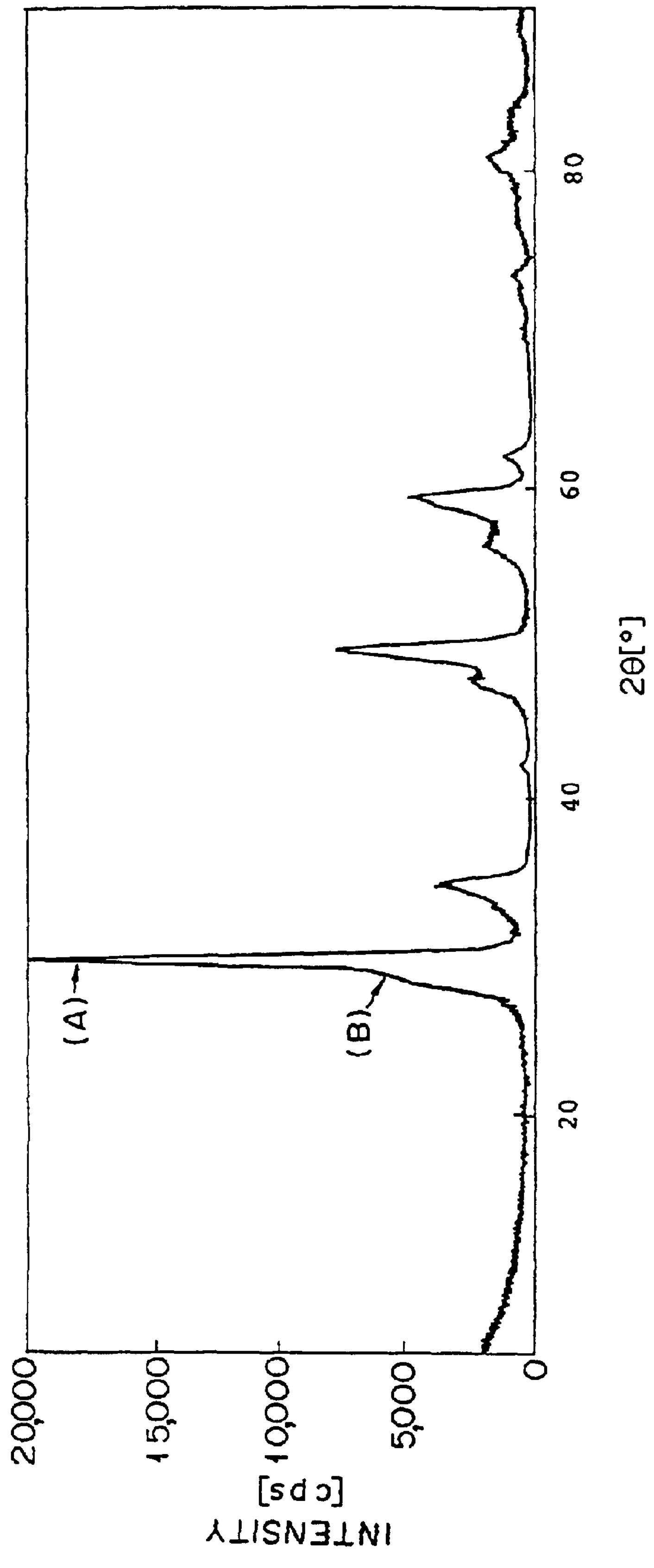
FIG. 3 shows a graph indicating an X-ray diffraction pattern of another complex in which the oxides of cerium are deposited on the solid solution oxide used in the present invention.
Figure 6:
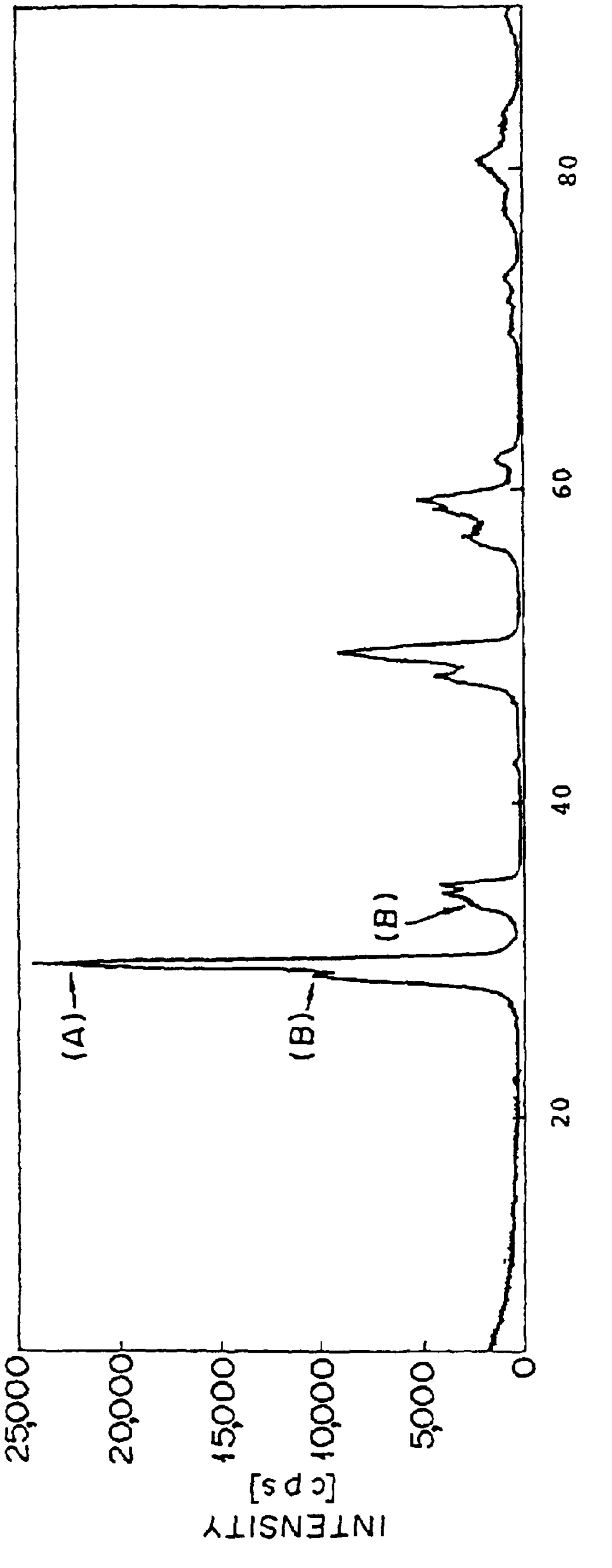
FIG. 6 shows a graph indicating an X-ray diffraction pattern of another complex in which the oxides of cerium are deposited on the solid solution oxide used in the present invention.

FIGS. 3 and 6 shows graphs indicating X-ray diffraction patterns of the complexes used in the present invention. The oxides of cerium are deposited on the solid solution oxide at 40% by weight as $CeO_2$, then one is calcined at 550° C. for FIG. 3, and the other calcined at 1,000° C. for FIG. 6.

Figure 7:
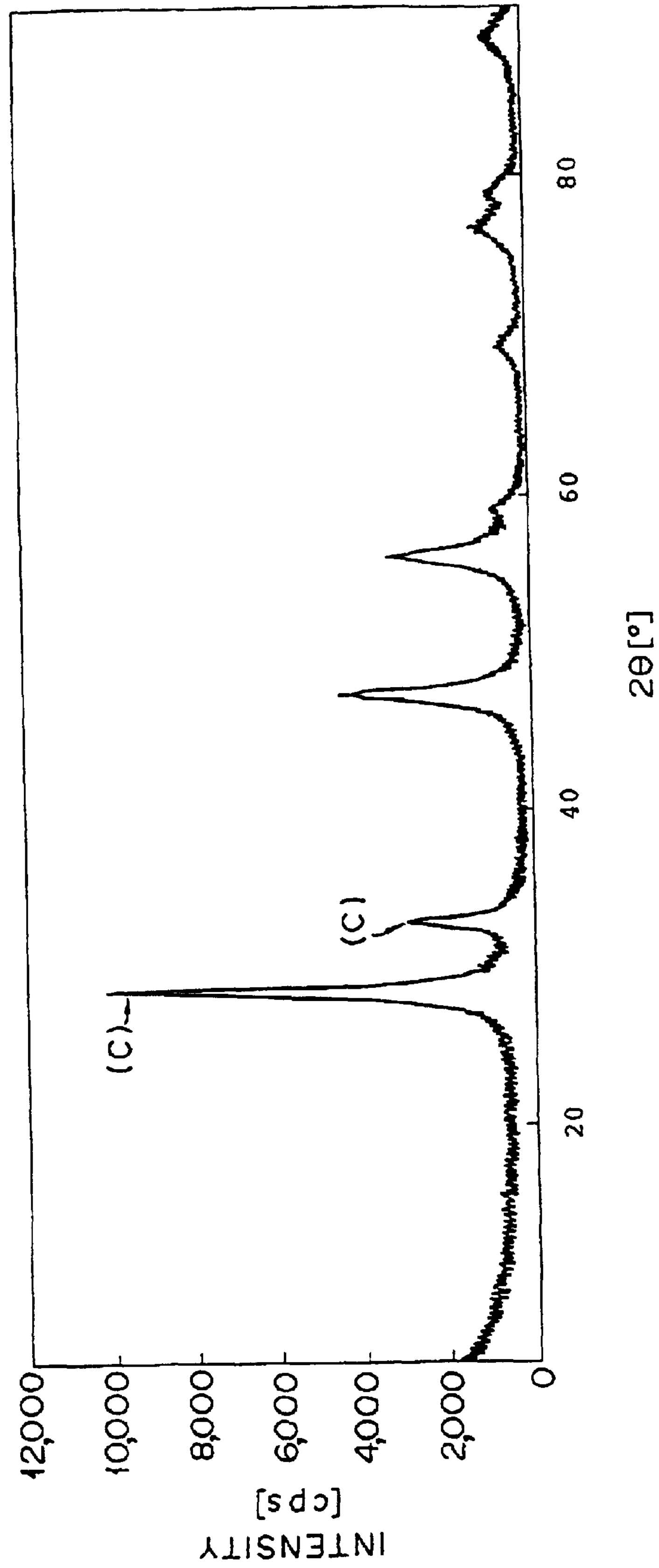
FIG. 7 shows a graph indicating an X-ray diffraction pattern of pure $CeO_2$.

FIG. 7 shows a graph indicating an X-ray diffraction pattern of pure $CeO_2$.

Figure 8:
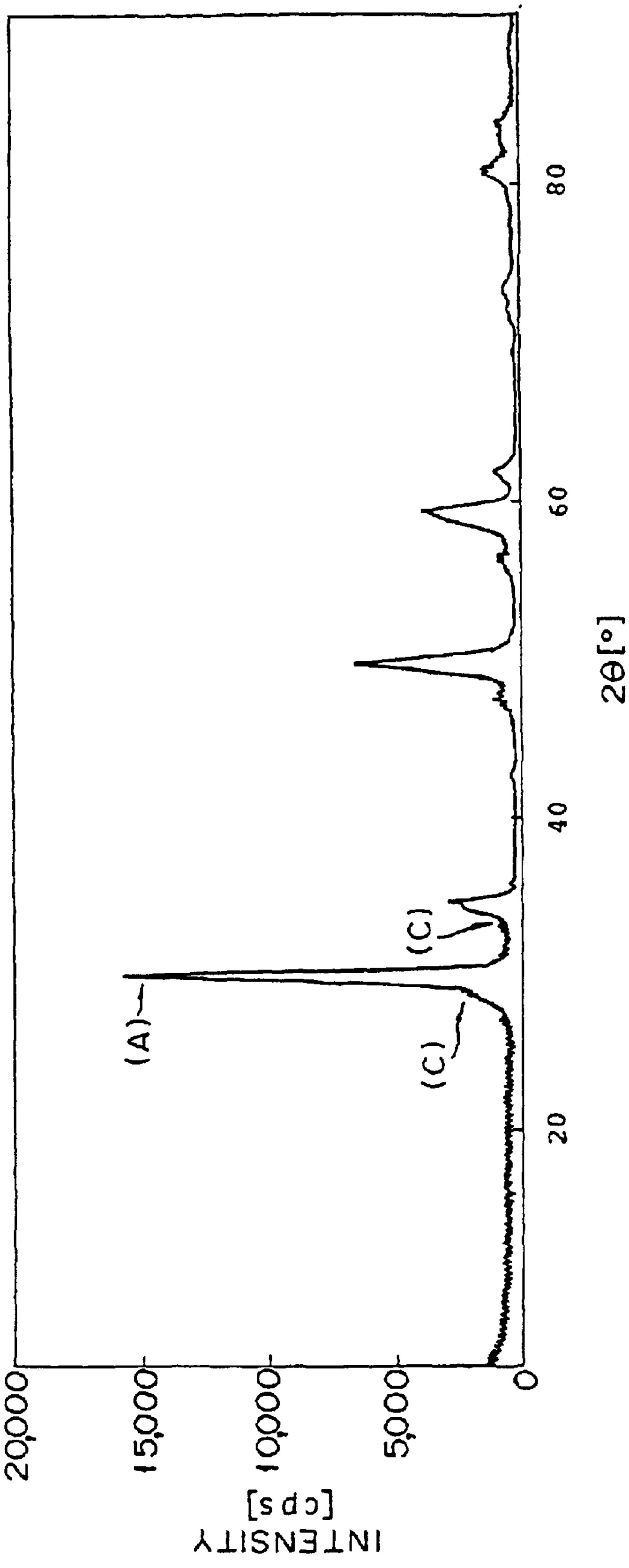
FIG. 8 shows a graph indicating an X-ray diffraction pattern of a physical mixture of $CeO_2$ with the solid solution oxide.

FIG. 8 shows a graph indicating an X-ray diffraction pattern of a physical mixture of $CeO_2$ with the solid solution oxide. Cerium is deposited on the solid solution oxide at 20% by weight as $CeO_2$, and one is calcined at 550° C. for FIG. 8.

Figure 9:
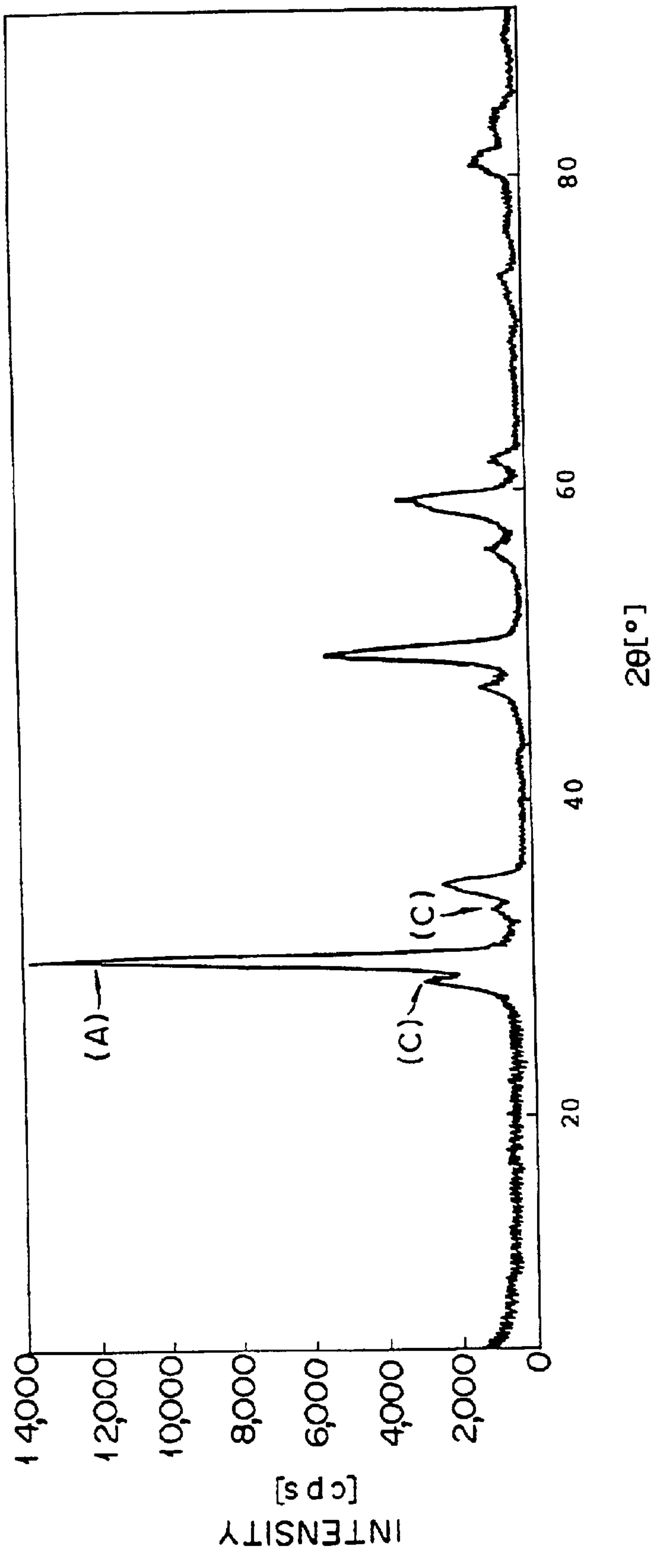
FIG. 9 shows a graph indicating an X-ray diffraction pattern of another physical mixture of $CeO_2$ with the solid solution oxide.

FIG. 9 shows a graph indicating X-ray diffraction patterns of another physical mixture of $CeO_2$ with the solid solution oxide. Cerium is deposited on the solution at 40% by weight as $CeO_2$, and one is calcined at 550° C. for FIG. 9.

The results obtained by the analysis of X-ray diffraction are summarized in Table 1.

TABLE 1

| | Peak angle (2θ) | | |
|---|---|---|---|
| | (B) *2 | (A) *1 | (C) *3 |
| FIG. 1 | N.D. | 29.810 | N.D. |
| FIG. 2 | Unclear | 29.750 | N.D. |
| FIG. 3 | 28.620 | 29.770 | N.D. |

TABLE 1-continued

| | Peak angle (2θ) | | |
|---|---|---|---|
| | (B) *2 | (A) *1 | (C) *3 |
| FIG. 4 | N.D. | 29.820 | N.D. |
| FIG. 5 | Unclear | 29.750 | N.D. |
| FIG. 6 | 28.860 | 29.720 | N.D. |
| FIG. 7 | N.D. | N.D. | 28.390 |
| FIG. 8 | N.D. | 29.750 | 28.460 |
| FIG. 9 | N.D. | 29.750 | 28.420 |

(B) *2: It shows a peak originated from the substrate in which CeOx is deposited on the solid solution oxide.
(A) *1: It shows a peak originated from the solid solution oxide.
(C) *3: It shows a peak originated from pure $CeO_2$.

Accordingly, the present complex can be differentiated by means of an X-ray diffraction method from the physical mixture in which $CeO_2$ is physically mixed with the solid solution oxide. This might mean that Ce deposited on the solid solution oxide has a strong interaction with the solid solution oxide through chemical bonding.

The exhaust gas purifying catalyst of the present invention may be used as Three Way Catalyst, preferably containing at least one of the following precious metals such as platinum, rhodium, or palladium as the catalyst components for removing CO, HC, and NOx from the exhaust gases. The precious metal may be appropriately used according to the conventional range known to the persons skilled in the art. For instance, Rh may be in the range of 0.05 to 5 g, preferably 0.1 to 3 g; Pt in the range of 0.1 to 5 g, preferably 0.3 to 4 g; Pd in the range of 0.3 to 50 g, preferably 0.5 to 30 g, per liter of the catalyst support, provided the amount of precious metals is added up with the amount of precious metals that are used elsewhere if present.

The catalyst containing the precious metals and the complex in which the oxides of cerium are deposited on the solid solution oxide containing zirconium and cerium may be used as it is, but ordinary deposited on a refractory three-dimensional structure or beads. The monolithic carrier proves preferable in view of a lower pressure loss. The monolithic carriers which are usable herein generally include honeycomb carriers using cordierite, mullite, α-alumina, zirconia, titania, titanium phosphate, aluminum titanate, alumino silicate, and magnesium silicate as raw materials and integral structures using such heat-resistant metals as stainless steel and Fe—Cr—Al alloys, for example.

The monolithic carrier is produced by a method of extrusion molding, or reeling a sheet like element into a roll, or the like. The shape of the gas passages in the monolithic carrier (the shape of cells) may be hexagon, tetragon, triangle, or corrugation whichever best suits the occasion. The cell density {the number of cells per unit cross section, 6.45 $cm^2$ (1 square inch)} is generally in the range of 100 to 1,200 cells, though variable with the kinds of exhaust gas such as unburnt hydrocarbon, carbon monoxide, and nitrogen oxides which emanate from plants and internal combustion engines such as automobile engines. Incidentally, the visible shape of the carrier is not discriminated, but may be a triangle, circular, elliptic, or rectangular cross section.

Deposition of the catalyst component, which includes the complex on the structure, is not particularly restricted, but may include impregnation or washcoat. For example, a monolith is impregnated with a slurry derived from wet milling of the complex, then excess of the slurry is blown out from the structure by means of pressured air, and dried, e.g., at a temperature of 80° C. to 250° C., preferably 100° C. to 200° C. When necessary, the dried monolith is calcined at a temperature of 300° C. to 800° C., preferably 400° C. to 600° C. for 0.5 to three hours, preferably one to two hours.

The deposition amount of the complex on the structure is not particularly restricted, but may be in the range of 10 to 150 g, preferably 20 to 100 g, per liter of the structure. If this amount is less than 10 g, it will not give sufficient catalytic activity. Adversely, if the amount exceeds 150 g, it will not effect on the activity in proportion to the addition thereof and not preferred in an economical view. Further, the total amount of the catalyst components including the inorganic oxide and precious metals may be in the range of 50 to 400 g, preferably 100 to 300 g, per liter of the structure. If this amount is less than 50 g, it will not effect on the catalytic activity sufficiently. Adversely, if the amount exceeds 400 g, it will sometimes increase the resistance to the gas flow through the structure, thereby pressure loss is unfavorably increased.

The exhaust gas purifying catalyst of the present invention is preferably used for treating exhaust gases from internal combustion engines such as gasoline, preferably operated under not only small but large fluctuation conditions of A/F, in particular in the range of 14.6±6.0, excluding the range which can be caused by a rapid acceleration and the release of an accelerator, with a high purification ratio of CO and NOx. In addition, the present catalyst can purify HC in the exhaust gas as high as that of the conventional catalyst.

EXAMPLES

The present invention will be explained with reference to examples. However, the present invention is not limited to these examples. The term "part" indicates part by weight unless otherwise is noted.

Example 1

With 1,000 parts of oxide powder of the solid solution containing zirconium and cerium (Zr:Ce molar rate=0.75:0.25, specific surface area after treated at 900° C. for 5 hours in air:55 $m^2$/gram, XRD peak ratio after treated 1,000° C. for 3 hours in air: no substantial $CeO_2$ pattern) was impregnated cerium nitrate corresponding to 200 parts as $CeO_2$, the resultant dried at 120° C. for a night and then calcined at 550° C. for 3 hours at atmosphere of air to give the oxides of cerium-deposited powder.

A mixture of the oxides of cerium-deposited powder obtained above, 2,000 parts of alumina powder deposited with Pt and Rh, and water was milled to give a slurry. A honeycomb carrier of cordierite (available from NGK industries in Japan, 1 liter of an oval, 400 cell/1 $in^2$ (6.45 $cm^2$)) was impregnated with the slurry obtained, then dried at 150° C. for one hour, and subsequently calcined at 500° C. for 30 min. in air.

The catalyst obtained had, per liter of catalyst, 1.5 g of Pt, 0.3 g of Rh, 46.9 g of the solid solution oxide, 9.4 g of cerium-containing oxides calculated as $CeO_2$, and 91.9 g of alumina.

Comparative Example 1

The procedure of Example 1 was repeated, except that cerium nitrate was omitted. 200 parts of alumina were added for accounting the amount of catalyst components being 150 g per liter catalyst.

Comparative Example 2

The procedure of Example 1 was repeated, except that the deposition of cerium nitrate was omitted. Separately 200 parts of ceria was added.

Comparative Example 3

The procedure of Example 1 was repeated, except that zirconium nitrate accounting to 200 parts of zirconium dioxide was used instead of cerium nitrate.

Example 2

With 1,000 parts of oxide powder of the solid solution containing zirconium and cerium (Zr:Ce:La:Nd molar rate=0.70:0.20:0.05:0.05, specific surface area after treated at 900° C. for 5 hours in air:45 $m^2$/gram, XRD peak ratio after treated 1,000° C. for 3 hours in air: no substantial $CeO_2$pattern) was impregnated palladium nitrate, cerium nitrate corresponding to 400 parts as $CeO_2$ and barium acetate corresponding to 200 parts as BaO, the resultant dried at 120° C. for a night and then calcined at 650° C. for 3 hours at atmosphere of air to give a Pd, the oxides of cerium, barium oxide-deposited powder.

A mixture of the powder obtained above, 1,500 parts of alumina powder deposited with Pd and Pr, and water was milled to give a slurry. A honeycomb carrier (supra) was impregnated with the slurry obtained, then dried at 150° C. for two hour, and subsequently calcined at 500° C. for 30 min. in air.

The catalyst obtained had, per liter of catalyst, 3 g of Pd, 63.5 g of the solid solution oxide, 25.4 g of cerium-containing oxides calculated as $CeO_2$, 12.7 g of barium oxide, 93.9 g of alumina, and 1.4 g of oxides of Pr.

Comparative Example 4

The procedure of Example 2 was repeated, except that cerium nitrate was omitted. 400 parts of alumina were added for accounting the amount of catalyst components being 200 g per liter catalyst.

Example 3

With 1,000 parts of oxide powder of the solid solution containing zirconium and cerium (Zr:Ce molar rate=0.6:0.4, specific surface area after treated at 900° C. for 5 hours in air:40 $m^2$/gram, XRD peak ratio after treated 1,000° C. for 3 hours in air: no substantial $CeO_2$ pattern) was impregnated cerium acetate corresponding to 200 parts as $CeO_2$, the resultant dried at 120° C. for a night and then calcined at 550° C. for 3 hours at atmosphere of air to give the oxides of cerium-deposited powder.

A mixture of the oxides of cerium-deposited powder obtained above, 1,000 parts of alumina powder deposited with Rh, and water was milled to give a slurry. The honeycomb catalyst deposited with Pd, barium oxide and alumina, was additionally impregnated with the slurry obtained, then dried at 150° C. for two hour, and subsequently calcined at 500° C. for one hour in air to produce a catalyst having 200 g of the catalyst components per liter of the catalyst.

The catalyst obtained had, per liter of catalyst, 3 g of Pd, 0.3 g of Rh, 45.3 g of the solid solution oxide, 9.1 g of cerium-containing oxides calculated as $CeO_2$, 5.0 g of barium oxide, and 137.3 g of alumina.

Comparative Example 5

The procedure of Example 3 was repeated, except that cerium nitrate was omitted. 200 parts of alumina were added for accounting the amount of catalyst components being 200 g per liter catalyst.

Evaluation for Catalysts

The catalysts thus obtained above were aged and then estimated its performances by sweep method using a commercially available gasoline engine (type: 6-cylindered engine of 2,400 cc displacement). The A/F ratio was changed continuously from A/F=14.1 to 15.1 with the simultaneous analysis of both inlet and outlet gases. Purification rates at crossover point of CO/NOx (crossover point: intersection of CO and NOx purification curves in A/F sweep method) for respective catalysts obtained are shown in Tables 2 through 4.

Evaluation Results by Engines

SV at evaluated: 80,000 $hr^{-1}$

Gas composition:

CO: 2 to 0.8% (1.4% at A/F=14.6)

HC: 3,300 to 2,500 ppm (3,000 ppm at A/F=14.6)

NOx: 1,500 to 1,600 ppm (1,600 ppm at A/F=14.6)

TABLE 2

CO/NOx crossover point for Pt-Rh catalysts

| | Purification rate at 500° C. (%) | |
|---|---|---|
| A/F fluctuation | 14.6 ± 0.5 | 14.6 ± 1.5 |
| Example 1 | 96.0 | 89.5 |
| Comparative Example 1 | 94.8 | 67.2 |
| Comparative Example 2 | 94.8 | 70.0 |
| Comparative Example 3 | 95.3 | 68.0 |

Aging condition: 950° C. × 40 hours
SV: About 120,000 $hr^{-1}$
Fluctuation period: 1 Hz

TABLE 3

CO/NOx crossover point for Pd catalysts

| | Purification rate at 500° C. (%) | |
|---|---|---|
| A/F fluctuation | 14.6 ± 0.5 | 14.6 ± 1.5 |
| Example 2 | 88.5 | 86.0 |
| Comparative Example 4 | 88.0 | 65.0 |

Aging condition: 850° C. × 40 hours
SV: 120,000 $hr^{-1}$
Fluctuation period: 1 Hz

TABLE 4

CO/NOx crossover point for Pd-Rh catalyst

| | Purification rate at 500° C. (%) | |
|---|---|---|
| A/F fluctuation | 14.6 ± 0.5 | 14.6 ± 2.0 |
| Example 3 | 95.0 | 91.5 |
| Comparative Example 5 | 93.0 | 70.5 |

Aging condition: 850° C. × 40 hours
SV: 120,000 $hr^{-1}$
Fluctuation period: 1 Hz The entire disclosure of Japanese Patent Application No. 2000-377705 filed on Dec. 12, 2000 including specification, claims and summary are incorporated herein by reference in its entirety.

What is claimed is:

1. A catalyst for purifying exhaust gases from an internal combustion engine, comprising a complex of oxides of cerium and a solid solution oxide containing Zr and Ce.

2. A catalyst according to claim 1, wherein the complex has the oxides of cerium deposited on the solid solution oxide.

3. A catalyst according to claim 1, wherein a molar ratio of Ce:Zr in the solid solution oxide is in the range of 0.05 to 0.49:0.95 to 0.51.

4. A catalyst according to claim 1, wherein a powder of the solid solution oxide indicates only diffraction pattern for zirconium dioxide but substantially no diffraction pattern for cerium dioxide by means of X-ray diffraction method.

5. A catalyst according to claim 1, wherein the solid solution oxide is dispersed on a refractory inorganic oxide.

6. A catalyst according to claim 5, wherein a deposition rate of the inorganic oxide to the solid solution oxide is up to 100 parts by weight based on 1 part by weight of the solid solution oxide.

7. A catalyst according to claim 5, wherein the inorganic oxide is alumina.

8. A catalyst according to claim 1 further comprising at least one member selected from the group consisting of Pt, Pd, Rh, Ir, Nd, Ba, La, Y and Pr deposited on the complex in the range of 0.05 to 30 parts by weight based on the 100 parts by weight of the complex.

9. A catalyst according to claim 1, wherein the complex is obtained by depositing a soluble salt of cerium to the solid solution oxide.

10. A catalyst according to claim 9, wherein the soluble salt is a water-soluble-salt of cerium.

11. A catalyst according to claim 10, wherein the water-soluble salt is cerium acetate or cerium nitrate.

12. A catalyst according to claim 9, wherein the complex is obtained by depositing the soluble salt of cerium to the solid solution oxide, and then calcining the resultant at a temperature of 300° C. to 1,200° C.

13. A catalyst according to claim 1, wherein the solid solution oxide further contains at least one doping member selected from the group consisting of a rare earth element except for cerium, an alkaline earth metal, Y, Al, Fe, and mixtures thereof.

14. A catalyst according to claim 13, wherein a rate of the doping member to the solid solution oxide is in the range of 0.1 to 20:100 parts by weight.

15. A catalyst according to claim 1 further comprising at least one precious metal selected from the group consisting of Pt, Rh, Pd and mixtures thereof.

16. A catalyst according to claim 1, wherein the complex is deposited on a refractory three-dimensional structure.

17. A catalyst according to claim 1, wherein the internal engine is a gasoline engine.

18. A method for producing exhaust gases purification catalyst, comprising depositing a soluble salt of cerium to a solid solution oxide containing Zr and Ce to form a complex thereof.

* * * * *